(12) United States Patent
Baylot et al.

(10) Patent No.: US 9,874,295 B2
(45) Date of Patent: Jan. 23, 2018

(54) CLAMP ASSEMBLY FOR PIPE-LAYING VESSEL AND METHOD OF LAYING A PIPELINE

(75) Inventors: Michel Pierre Armand Baylot, Venice (IT); Yann Hajeri, Treviso (IT); Kimon Tullio Ardavanis, Sanremo (IT); Stefano Bianchi, Cernusco (IT)

(73) Assignee: SAIPEM S.P.A., Milan (IT)

( * ) Notice: Subject to any disclaimer, the term of this patent is extended or adjusted under 35 U.S.C. 154(b) by 880 days.

(21) Appl. No.: 13/978,858

(22) PCT Filed: Jan. 26, 2012

(86) PCT No.: PCT/EP2012/051270
§ 371 (c)(1),
(2), (4) Date: Jul. 9, 2013

(87) PCT Pub. No.: WO2012/101232
PCT Pub. Date: Aug. 2, 2012

(65) Prior Publication Data
US 2013/0279989 A1    Oct. 24, 2013

(30) Foreign Application Priority Data
Jan. 28, 2011 (GB) .................................. 1101577.3

(51) Int. Cl.
*F16L 1/19* (2006.01)
*F16L 1/20* (2006.01)

(52) U.S. Cl.
CPC ................ *F16L 1/19* (2013.01); *F16L 1/207* (2013.01)

(58) Field of Classification Search
CPC ....... F16L 1/12; F16L 1/14; F16L 1/15; F16L 1/16; F16L 1/161; F16L 1/18; F16L 1/19; F16L 1/207; F16L 1/235
(Continued)

(56) References Cited

U.S. PATENT DOCUMENTS 3,011,318 A    12/1961  Ashton
3,658,222 A     4/1972  Dressel et al.
(Continued)

FOREIGN PATENT DOCUMENTS

EP    0 020 257 A1    12/1980
EP    0 657 670 A2     6/1995
(Continued)

OTHER PUBLICATIONS

Written Opinion (PCT/ISA/237) dated Oct. 5, 2012, by the European Patent Office as the International Searching Authority for International Application No. PCT/EP2012/051271. (12 pages).
(Continued)

*Primary Examiner* — Sunil Singh
(74) *Attorney, Agent, or Firm* — Buchanan Ingersoll & Rooney PC (57) ABSTRACT

A pipe-laying vessel including a pipe-laying tower extending upwardly from the vessel, the vessel including a welding station for joining a new pipestring to an end of the pipeline held by the tower, a clamp assembly on the tower for engaging a pipestring with a lower end adjacent to the end of the pipeline held by the tower and with the pipestring extending upwardly from its lower end alongside the tower, wherein the clamp assembly includes a pipestring clamp that serves both the function of a transfer clamp for transferring the pipestring from a position alongside the tower but displaced from the pipe-laying path to a position approximately aligned with the pipe-laying path, and the function of a line-up clamp for lining up the pipestring with the end of the pipeline.

24 Claims, 9 Drawing Sheets

(58) Field of Classification Search
USPC ...... 405/158, 166, 168.1, 168.3, 168.4, 169, 405/170; 414/22.54, 137.5, 137.7, 745.4
See application file for complete search history.

(56) References Cited

U.S. PATENT DOCUMENTS

| | | | |
|---|---|---|---|
| 3,860,122 | A | 1/1975 | Cernosek |
| 4,068,490 | A | 1/1978 | Jeousse |
| 4,431,342 | A | 2/1984 | Torresen et al. |
| 4,472,079 | A | 9/1984 | Langner |
| 5,421,675 | A | 6/1995 | Brown et al. |
| 5,464,307 | A | 11/1995 | Wilkins |
| 6,273,643 | B1 | 8/2001 | Baugh |
| 6,352,388 | B1 | 3/2002 | Seguin |
| 6,361,250 | B1 | 3/2002 | de Varax |
| 6,592,297 | B2 | 7/2003 | Frijns et al. |
| 6,910,848 | B1 | 6/2005 | Baugh |
| 7,713,000 | B2 * | 5/2010 | Verkuijl ............. B23K 37/0533 405/158 |
| 7,806,628 | B2 | 10/2010 | Willis |
| 8,628,287 | B2 * | 1/2014 | Vehmeijer ............ B63B 35/306 166/355 |
| 2001/0033773 | A1 | 10/2001 | Baugh |
| 2001/0041095 | A1 | 11/2001 | Baugh |
| 2002/0009333 | A1 | 1/2002 | Willis |
| 2002/0021943 | A1 * | 2/2002 | Frijns ................. B23K 37/0533 405/170 |
| 2006/0249292 | A1 | 11/2006 | Guidry |
| 2007/0258772 | A1 | 11/2007 | Bursaux et al. |
| 2008/0118311 | A1 | 5/2008 | Roodenburg et al. |
| 2008/0170911 | A1 | 7/2008 | Snowdon et al. |
| 2009/0220306 | A1 | 9/2009 | Roodenburg et al. |
| 2010/0107956 | A1 | 5/2010 | Foce |
| 2010/0119307 | A1 | 5/2010 | Pollack et al. |
| 2010/0176079 | A1 | 7/2010 | Lucas et al. |
| 2011/0081204 | A1 | 4/2011 | van Grieken et al. |

FOREIGN PATENT DOCUMENTS

| | | |
|---|---|---|
| EP | 0 661 488 A1 | 7/1995 |
| EP | 1 102 698 B1 | 9/2004 |
| EP | 1 696 163 A1 | 8/2006 |
| EP | 2 208 853 A2 | 7/2010 |
| GB | 1 498 748 A | 1/1978 |
| GB | 1 499 247 A | 1/1978 |
| GB | 2 336 191 A | 10/1999 |
| GB | 2 469 519 A | 10/2010 |
| WO | WO 01/07812 A1 | 2/2001 |
| WO | WO 2004/068012 A2 | 8/2004 |
| WO | WO 2005/085692 A1 | 9/2005 |
| WO | WO 2005/095835 A1 | 10/2005 |
| WO | WO 2006/085739 A1 | 8/2006 |
| WO | WO 2007/000609 A2 | 1/2007 |
| WO | WO 2007/108673 A1 | 9/2007 |
| WO | WO 2007/120035 A1 | 10/2007 |
| WO | WO 2008/041837 A1 | 4/2008 |
| WO | WO 2008/099355 A1 | 8/2008 |
| WO | WO 2008/107186 A1 | 9/2008 |
| WO | WO 2008/120977 A1 | 10/2008 |
| WO | WO 2009/148297 A1 | 12/2009 |
| WO | WO 2009/153352 A2 | 12/2009 |
| WO | WO 2009/153354 A2 | 12/2009 |
| WO | WO 201 0/071 41 | 6/2010 |
| WO | WO 2011/010207 A1 | 1/2011 |
| WO | WO 201 1/01 671 | 2/2011 |

OTHER PUBLICATIONS

International Search Report (PCT/ISA/210) dated Aug. 2, 2012, by the European Patent Office as the International Searching Authority for International Application No. PCT/EP2012/051270.
Written Opinion (PCT/ISA/237) dated Aug. 2, 2012, by the European Patent Office as the International Searching Authority for International Application No. PCT/EP2012/051270.
International Search Report (PCT/ISA/210) dated Oct. 5, 2012, by the European Patent Office as the International Searching Authority for International Application No. PCT/EP2012/051271.
Office Action dated Dec. 1, 2015 by the U.S. Patent and Trademark Office in corresponding U.S. Appl. No. 13/978,911 (14 pages).

* cited by examiner

CLAMP ASSEMBLY FOR PIPE-LAYING VESSEL AND METHOD OF LAYING A PIPELINE

BACKGROUND OF THE INVENTION

This invention relates to pipe-laying vessels and to methods of laying a pipeline. Such vessels and methods are of particular use in the offshore industry relating to oil and gas production. The invention relates more particularly to a clamp assembly on a pipe-laying tower of a pipe-laying vessel.

One of the tasks that is carried out by certain vessels in the offshore industry is that of laying pipelines, either by S-laying or by J-laying.

In "S" laying, the pipeline leaves the vessel at little or no inclination to the horizontal, adopts a steeper inclination in the water and then returns to a generally horizontal disposition on the seabed. The tension in the pipeline is often accommodated by a series of track tensioners mounted along the pipe-laying path, on the vessel. The track tensioners support the weight of the pipeline and control passage of the pipeline. S laying is preferred in shallower water where the natural path of the pipeline is only ever inclined at a shallow angle as it passes to the seabed. Examples of S-laying arrangements are shown in WO 2006/085739 and WO 2007/000609.

In "J" laying, the pipeline leaves the vessel at a steep or vertical inclination and the inclination steadily reduces until the pipeline is in a generally horizontal disposition on the seabed. J laying often involves moving a new pipeline section from a substantially horizontal position (along the deck of the vessel) into a vertical position to align with a J lay tower mounted on the vessel. A lower end of the new pipeline section is welded to the upper end of the pipeline, which is held in place, suspended from the vessel, by a fixed clamp, located towards the bottom of the J lay tower. Once the new section of pipeline has been added to the existing pipeline, the fixed clamp is released and the pipeline lowered down the J lay tower. During such lowering the tension in the pipeline may be accommodated by a travelling block or track tensioners. The upper end of the newly lengthened pipeline (i.e. the upper end of the new section of pipeline) is then clamped by the fixed clamp, the travelling block, if used, is returned to its original position towards the top of the J lay tower and the process repeated. J-laying is used primarily for laying pipeline in deep water (that is typically deeper than 1,000 m). Examples of J-laying arrangements are shown in WO 2009/153352 and WO 2009/153354.

In the arrangements shown in WO 2009/153352 and WO 2009/153354, a pipestring is brought into a position alongside a J lay tower on a loading arm and is then transferred from that position to one aligned with the pipe-laying path by the clamps on the loading arm. Once the pipestring is in position on the pipe-laying path, it is engageable by three line-up clamps which position the pipestring in the correct position relative to the end of the pipeline to which the pipestring is to be joined. An internal line-up system (referenced 75 in the specifications) is mounted on the top of the tower structure.

It is an object of the invention to provide an improved pipe-laying vessel and an improved method of laying a pipeline.

SUMMARY OF THE INVENTION

According to a first aspect of the invention, there is provided a pipe-laying vessel including a pipe-laying tower extending upwardly from the vessel, the vessel comprising a welding station for joining a new pipestring to an end of the pipeline held by the tower, a clamp assembly on the tower for engaging a pipestring with a lower end adjacent to the end of the pipeline held by the tower and with the pipestring extending upwardly from its lower end alongside the tower, wherein the clamp assembly comprises a pipestring clamp that serves both the function of a transfer clamp for transferring the pipestring from a position alongside the tower but displaced from the pipe-laying path to a position approximately aligned with the pipe-laying path, and the function of a line-up clamp for lining up the pipestring with the end of the pipeline.

By providing a pipestring clamp that serves both for transferring a pipestring into a pipe-laying path and for lining-up the pipestring, the clamp arrangements can be simplified and some of the procedures speeded-up.

Preferably, the pipestring clamp is in the region of the top of the tower. Preferably, the pipestring clamp is for clamping around an upper end of the pipestring.

Preferably, the pipe-laying vessel also comprises a separate pipestring elevator for rotating a pipestring from a substantially horizontal orientation at the base of the tower to an orientation substantially parallel to the tower. Preferably, the clamp assembly is mounted not on the pipestring elevator. Preferably, the clamp assembly, when serving the function of the transfer clamp, transfers the pipestring from the pipestring elevator to the position approximately aligned with the pipe-laying path.

Preferably the pipestring clamp is a friction clamp. The pipestring clamp is preferably arranged to bear at least the major part of the weight of the pipestring. In that case it is especially significant that the same clamp is used for both transferring and lining-up the pipestring.

Whilst it is within the scope of the invention for there to be just a single pipestring clamp, there will usually be several such clamps. The "clamp assembly" according to the invention is exemplified in an embodiment of the invention described below by a clamp assembly referred to below as a "tower clamp assembly" and including a friction clamp as the pipestring clamp according to the invention. The vessel may further include one or more further line-up clamps for lining up the pipestring with the end of the pipeline. Whilst it is within the scope of the invention for those further line-up clamps also to serve the function of transferring the pipestring into the pipe-laying path, in an embodiment of the invention described below they do not. In that described embodiment there are two further line-up clamps and one further transfer clamp referred to in the embodiment as a "tower arm" for transferring a pipestring into the pipe-laying path.

The clamp assembly is preferably mounted on the tower. The clamp assembly is preferably mounted for pivotal movement about an axis substantially parallel to the longitudinal axis of the tower. The assembly may be mounted for movement about more than axis substantially parallel to the longitudinal axis of the tower and in a described embodiment of the invention is mounted for movement about two spaced parallel axes parallel to the longitudinal axis of the tower. This provides for a wide range of movements of the assembly in a horizontal plane.

The clamp assembly is preferably mounted for translational movement in a direction substantially parallel to the longitudinal axis of the tower. Preferably, the translational movement is limited to an upper portion of the tower. Preferably the translational movement is in addition to the mounting for pivotal movement and, for example, allows a pipestring to be lowered from a position above and spaced from an upper end of a pipeline to which the pipestring is to be joined to a position adjacent to the upper end of the pipeline.

Preferably the orientation of the pipestring clamp is adjustable. The orientation of the pipestring clamp is preferably adjustable through pivoting movement about an axis perpendicular to the longitudinal axis of the tower and, more preferably the orientation of the pipestring clamp is adjustable about two mutually perpendicular axes that are themselves perpendicular to the longitudinal axis of the tower. Such adjustment may be active or passive; in an embodiment of the invention described below, the adjustment is passive, with the orientation of the pipestring clamp being determined by the other line-up clamps.

The pipestring clamp is preferably also able to rotate the pipestring about its longitudinal axis. Preferably the pipestring can be rotated through more than 180 degrees; in an embodiment of the invention described below, the pipestring can be rotated through +/−190 degrees. Preferably this is an active adjustment. It may be controlled by an operator lining-up the pipestring held in the pipestring clamp.

The clamp assembly preferably further includes an internal line-up clamp arrangement. This enables the internal line-up clamp arrangement to be in fixed relationship with the pipestring clamp and therefore automatically aligned with the pipestring held in the pipestring clamp.

The internal line-up clamp arrangement preferably includes an internal line-up clamp garage and an internal line-up clamp. The internal line-up clamp arrangement preferably further includes an internal line-up clamp winch for raising and lowering the internal line-up clamp within the pipestring. The internal line-up clamp may take any conventional form.

Preferably the internal line-up clamp arrangement and the pipestring clamp are adjustably mounted for adjustment as a unit of their orientation relative to the tower. Preferably the internal line-up clamp arrangement and the pipestring clamp are fixed in relation to each other. Preferably the relative position and orientation of the internal line-up clamp arrangement and the pipestring clamp are non-adjustable. This helps to ensure that the internal line-up clamp arrangement is automatically lined up with a pipestring held in the clamp assembly.

The vessel may comprise a hang off clamp assembly provided at a lower region of the tower for clamping pipeline that has been deployed from the vessel and a travelling clamp with a travel path along a length of the tower for laying pipeline. Preferably the pipe-laying tower comprises a first lower section extending upwardly from a proximal end to a distal end above the main deck of the vessel, and a second upper section extending upwardly from the first lower section and having a length that is at least one third of the length of the lower section, wherein the travel path of the travelling clamp is limited to the lower section of the tower. The second upper section of the tower may be movably mounted on the first lower section of the tower, but it is possible for the first and second sections of the tower to be integral with one another. The preferred arrangement provides for a construction in which the upper section of the tower can be moved in relation to the lower section of the tower independently of the position of the travelling clamp.

The provision of a pipe-laying tower with upper and lower sections is described and claimed in UK patent application entitled "Pipe-laying Vessel and Method of Laying a Pipeline" with agent's reference "P015336 GB", having the same filing date as the present application. In particular, the claims of the present application may be amended to include features relating to the tower and other associated features relating to the tower such as the elevator for conveying a pipestring to a position alongside the tower and various clamps for engaging different parts of the pipestring and pipeline. Some of those features are mentioned briefly below in a description with reference to the drawings.

The tower is preferably of an overall length sufficient to accommodate two pipe strings end to end. A working station is preferably provided partway up the tower. It is also preferred that a working station is provided in the region of the bottom of the tower. In an embodiment of the invention described below, there is a working station in the region of the bottom of the tower and another working station partway up the tower. A working station is a station at which the pipeline being formed can be welded and/or coated and/or inspected.

In a case where two working stations are provided, they are preferably spaced apart by the length of a pipestring. It is then possible for a junction of two pipestrings to be inspected or worked on at one working station while another junction is inspected or worked on at another working station. The working stations are preferably manned.

In a case where the tower comprises a first lower section and a second upper section, there is preferably a working station in the region of the top of the first lower section.

The feature of providing a clamp assembly that also comprises an internal line-up clamp arrangement is itself a special and novel feature of the invention. Accordingly, in a second aspect of the invention there is provided a pipe-laying vessel including a pipe-laying tower extending upwardly from the vessel, the vessel comprising:

a welding station for joining a new pipestring to an end of the pipeline held by the tower, a plurality of clamps on the tower for holding a new pipestring with a lower end adjacent to the end of the pipeline held by the tower and with the pipestring extending upwardly from its lower end alongside the tower, wherein the plurality of clamps includes a pipestring clamp for clamping around an upper end of the pipestring and the pipestring clamp is part of a clamp assembly that also comprises an internal line-up clamp arrangement, the internal line-up clamp arrangement and the pipestring clamp being adjustably mounted for adjustment, as a unit, of their orientation relative to the tower.

Preferably, the pipestring clamp is in the region of the top of the tower. The pipestring clamp is preferably arranged to bear at least the major part of the weight of the pipestring.

Preferably, the pipe-laying vessel also comprises a separate pipestring elevator for rotating a pipestring from a substantially horizontal orientation at the base of the tower to an orientation substantially parallel to the tower. Preferably, the clamp assembly is mounted not on the pipestring elevator. Preferably, the clamp assembly, when serving the function of the transfer clamp, transfers the pipestring from the pipestring elevator to the position approximately aligned with the pipe-laying path.

It will be appreciated that all of the features described above as optional or preferred in respect of the first aspect of the invention may be employed in the second aspect of the invention and indeed most of them are employed in an embodiment of the invention described below.

Similarly, the feature of providing a pipestring clamp that is arranged to bear at least the major part of the weight of the pipestring and that is also able to rotate the pipestring about its longitudinal axis is itself a special and novel feature of the invention. Accordingly, in a third aspect of the invention there is provided a pipe-laying vessel including a pipe-laying tower extending upwardly from the vessel, the vessel comprising:

a welding station for joining a new pipestring to an end of the pipeline held by the tower, a plurality of clamps on the tower for holding a new pipestring with a lower end adjacent to the end of the pipeline held by the tower and with the pipestring extending upwardly from its lower end alongside the tower, wherein the plurality of clamps includes a pipestring clamp in the region of the top of the tower, the pipestring clamp is arranged to bear at least the major part of the weight of the pipestring and the pipestring clamp is also able to rotate the pipestring about its longitudinal axis.

Preferably, the pipestring clamp is for clamping around an upper end of the pipestring.

Preferably, the pipe-laying vessel also comprises a separate pipestring elevator for rotating a pipestring from a substantially horizontal orientation at the base of the tower to an orientation substantially parallel to the tower. Preferably, the clamp assembly is mounted not on the pipestring elevator. Preferably, the clamp assembly, when serving the function of the transfer clamp, transfers the pipestring from the pipestring elevator to the position approximately aligned with the pipe-laying path.

It will be appreciated that all of the features described above as optional or preferred in respect of the first aspect of the invention may be employed in the third aspect of the invention and indeed most of them are employed in an embodiment of the invention described below.

The present invention still further provides a method of laying a pipeline from a pipe-laying vessel, in which the vessel is in any of the forms described above.

Thus, by way of a first example, the method may include the step of using a clamp assembly both to transfer a pipestring from a position alongside the tower but displaced from the pipe-laying path to a position approximately aligned with the pipe-laying path and to line up the pipestring with the end of the pipeline. By way of a second example the method may include the step of providing an internal line-up clamp arrangement and a pipestring clamp as a unit and allowing adjustment of the orientation of the unit relative to the tower. By way of a third example the method may include the step of providing a pipestring clamp on the pipe-laying tower for bearing at least the major part of the weight of the pipestring and also for rotating the pipestring.

As should already be understood, features described in relation to one aspect of the present invention may be incorporated into other aspects of the present invention. For example, the features of the first, second and third aspects of the invention can all be combined and indeed are combined in a vessel embodying the invention and described below, and the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
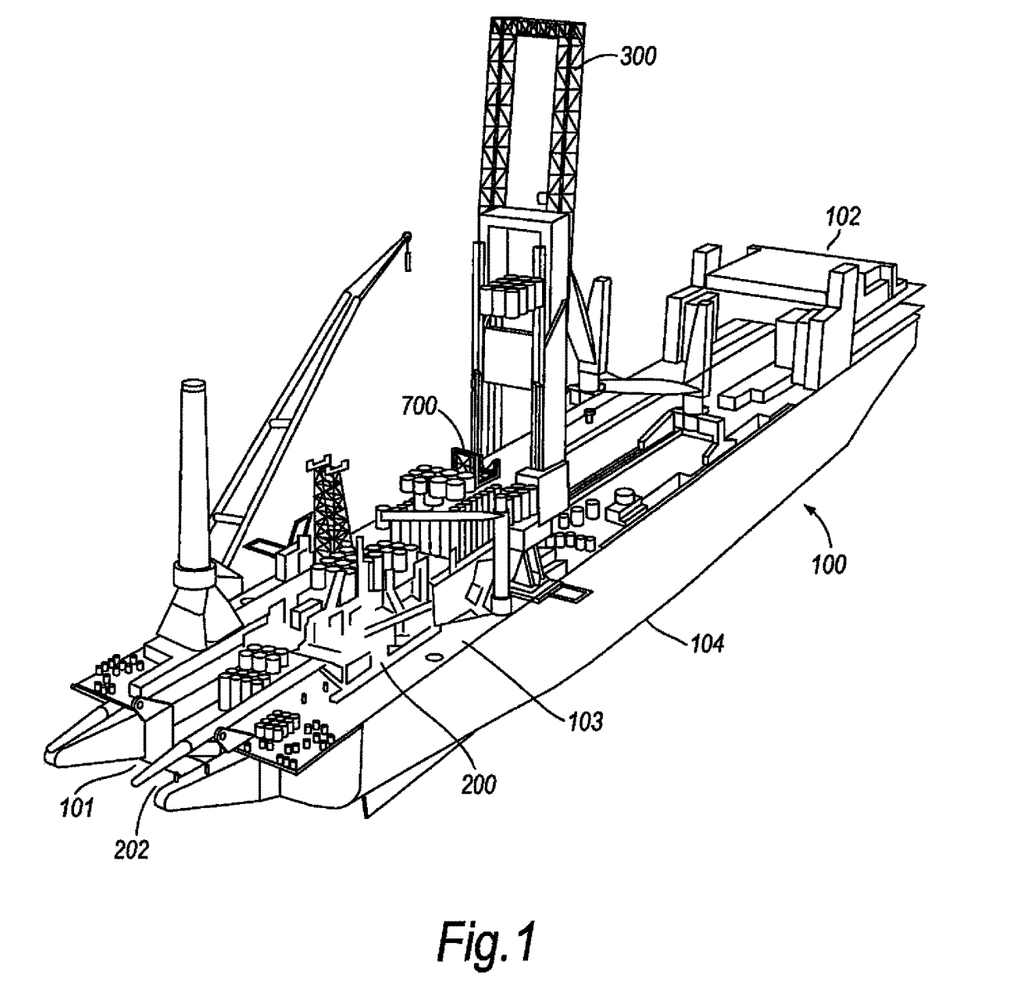
FIG. 1 shows a perspective view of a vessel according to an embodiment of the invention.

FIG. 1 shows a pipe-laying vessel 100. The vessel 100 has a bow end 102 and a stern end 101. The bottom of the vessel, known as the keel line, is labelled as 104. On the deck 103 of the vessel, at the stern end 101 are various ramps defining S-laying apparatus 200. Other S laying apparatus is provided towards the bow of the vessel as more fully described in WO2008/107186. At the stern end 101 is an S-lay opening 202 to allow the pipeline to enter the water near the stern of the vessel 100. The vessel 100 also has a J-laying tower 300 in a middle portion of the vessel partway along the firing line for S-laying.

Figure 2A:
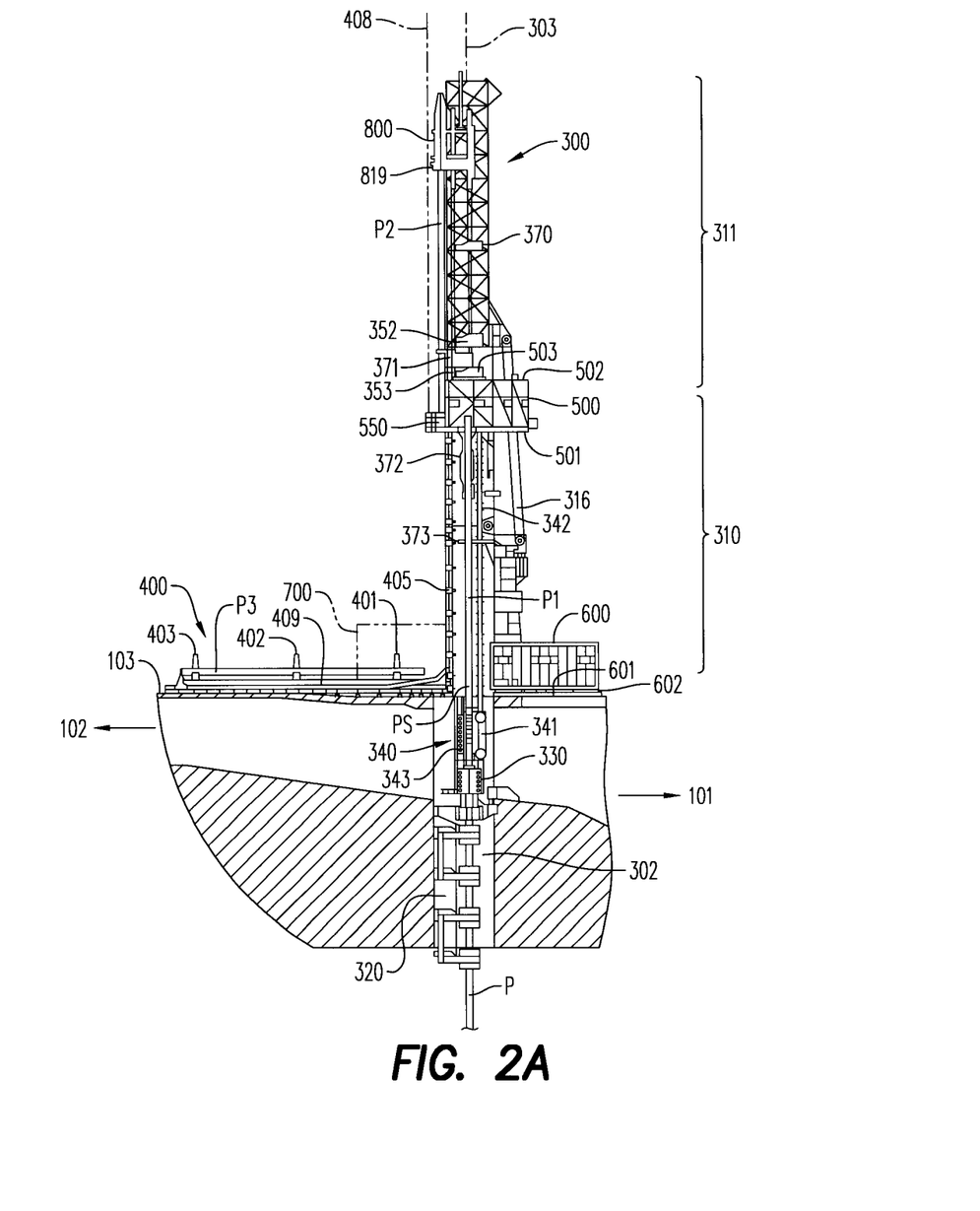
FIG. 2a shows a side view of the pipe-laying tower in an initial state, on the vessel of FIG. 1.
Figure 2B:
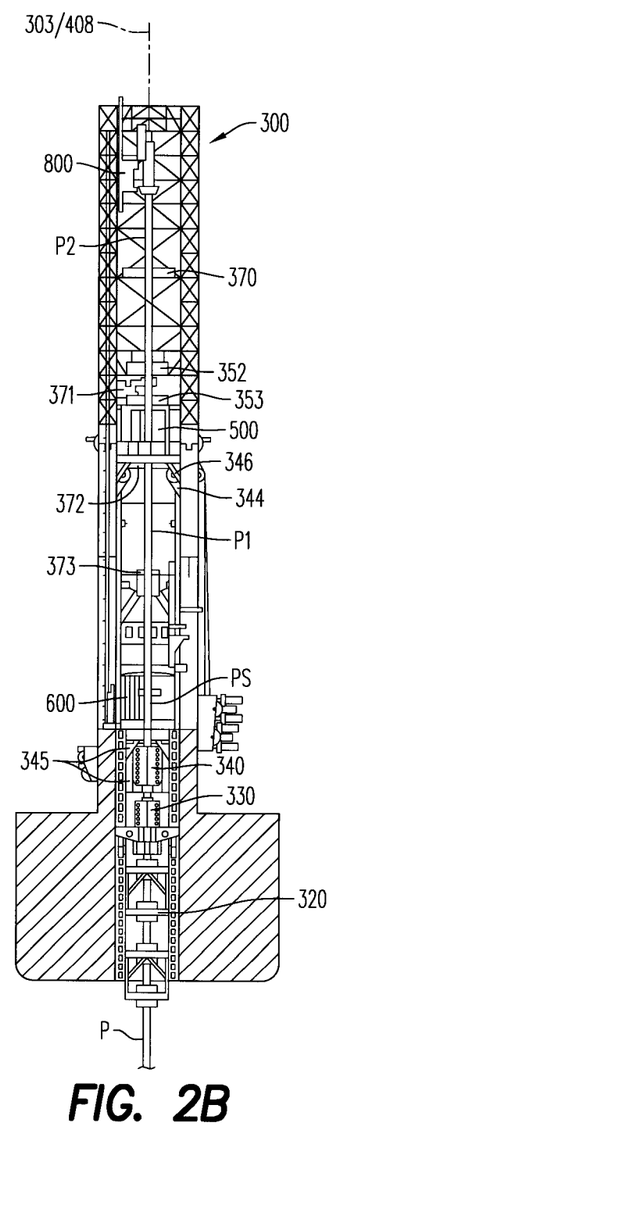
FIG. 2b shows a front view of the pipe-laying tower, also in an initial state.

FIGS. 2a and 2b show more detailed views of the J-lay tower 300 and associated equipment. The tower 300 extends upwards vertically from the deck 103 of the vessel.

Below the tower is an opening 302 in the hull of the vessel to the water beneath. This opening allows passage of the pipeline P from the tower 300 to the water.

In the following description, the pipeline comprises a deployed pipeline (where the pipeline in question comprises pipestrings that have been welded together and substantially deployed off the vessel 100 below the keel 104 of the vessel 100). This deployed pipeline is labelled as P. The pipeline also comprises a pipeline that has not been deployed yet and is still held on the vessel 100. This pipeline comprises a series of pipestrings PS, P1, P2, P3 which are already or will be welded together and then deployed in due course.

In particular, PS is the pipestring already welded at its bottom end to the deployed pipeline P. Hence, pipestring PS is partly deployed below the keel 104 and partly still on the vessel 100. P1 is the pipestring welded to the top end of PS and held in a lower section 310 of the tower, P2 is the pipestring that is being held in an upper section 311 of the tower and will be welded to the top of P1 in due course and P3 is the pipestring currently in a string elevator, which will be welded to the top of P2 in due course.

Attached to the side of the opening 302 is a flute 320 (sometimes called a J-stinger) which controls orientation of the pipeline P as it enters the water.

Above the flute 320 and still below the deck 103, is a hang off clamp assembly 330. The hang off clamp assembly 330 is located close to the flute 320 and just above the sea water level.

Above the hang off clamp assembly 330 is a travelling clamp assembly 340, mounted on two rails 342. The rails 342 extend from above the hang off clamp assembly 330, upwards through the opening 302, passing through the deck 103 of the vessel 100 and upwards through the J-lay tower 300 to just below a welding station 500 located on the tower 300 at about mid-height.

The travelling clamp assembly 340 comprises a friction clamp 343 mounted on a trolley 341 on the rails 342. The trolley 341 comprises four shoes 345 (one at each corner) which are made up of wheels and act as lateral guides to guide the travelling clamp assembly 340 up the rails 342. At the top of each rail is an upper sheave block 344 with a pulley wheel 346. The travelling clamp assembly 340 can be moved up and down the rails 342 by the use of cables 347 extending up, over these pulley wheels and attached to the travelling clamp assembly 340.

The friction clamp 343 is lined up so that it is along the length of the pipe-laying path or axis 303. The rails 342 extend parallel to this pipe-laying axis 303. The friction clamp 343 has two front doors (not shown) that can open to allow a pipestring containing a bulky item to be introduced into the clamp. In addition, the friction clamp 343 is mounted to the trolley 341 by means of elastic mounts to allow an oscillation of +/−1 degree during bulky item introduction.

On the deck 103 of the vessel, to one side of the tower 300 is a coating station 600. The coating station 600 is mounted on rollers 602 which run on track 601 in the deck 103 to allow the coating station 600 to be moved between a position adjacent the base of the tower 300 (a working position) and a position slightly removed from the base of the tower (a storage position). This allows the travelling clamp assembly 340 to pass by the coating station 600 and also allows bulky items to pass by.

The coating station 600 is separate from, and at a different height to, the welding station 500. This allows a pipestring to be coated as it passes through the coating station 600 (i.e. as the pipeline P is being laid by the travelling clamp assembly 340) after it has been welded to the pipestring above. The coating and welding steps can take place independently and in parallel. The coating station 600 can also perform non-destructive tests (NDT) on the pipeline P and, if necessary, repair or replace any defective welds.

On the other side of the tower 300, is a bulky item handling skid 700.

Also on that other side of the tower 300 is a string elevator 400. The string elevator is mounted on rails 405 which extend from the base of the tower 300, along the deck 103 of the vessel so that the string elevator can be accommodated horizontally on the deck 103 of the vessel. The rails 405 also extend up substantially the whole length of that side of the tower 300. The string elevator 400 holds a pipe-string P3 made up of 3 joints (3J). When the string elevator 400 is raised up the tower 300 on the rail 405, the pipe-string P3 is lined up with a string axis 408, which is parallel to the pipe-laying axis 303. The string elevator will be described in more detail in relation to FIG. 3.

Various clamps and other laying equipment are located along the length of the tower 300 as will now be described.

Starting from the top of the tower, there is located a tower clamp assembly 800, including an articulated friction line-up clamp 819. The tower clamp assembly 800 is pivotable so as to move a pipe-string from the string axis 408 to the pipe-laying axis 303. In FIGS. 2a and 2b, the tower clamp assembly is shown clamping a pipestring P2 at one side of the tower 300 in between the string axis 408 and the pipe-laying axis 303. The tower clamp assembly 800 will be described in more detail in relation to FIGS. 4a to 4c.

A tower arm 371 is located further down the tower, above the height of the welding station 500. The tower arm 371 is articulated (with a first and second arm) in the same way as the friction line-up clamp 819 of the tower clamp assembly 800. Hence, as the friction line-up clamp 819 transfers a top end of the pipestring P3 from the string axis 408 to the pipe-laying axis 303, the tower arm 371 is controlled in the same way to guide a bottom portion of the pipestring P3. This way the pipestring P3 stays vertical and can be lined up with the pipe-laying axis 303.

A tower roller 370 is located about halfway between the tower clamp assembly 800 and the tower arm 371 and is located on the pipe-laying axis 303. The tower roller 370 can be opened or closed around a pipestring P2 on the pipe-laying axis 303.

Figure 5A:
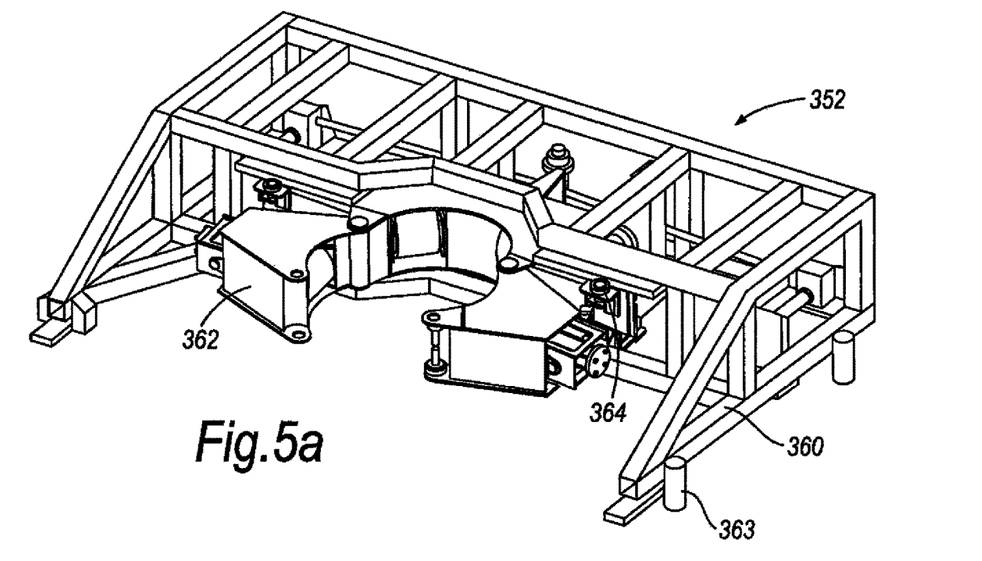
FIG. 5a shows a perspective view of a tower clamp mechanism.
Figure 5B:
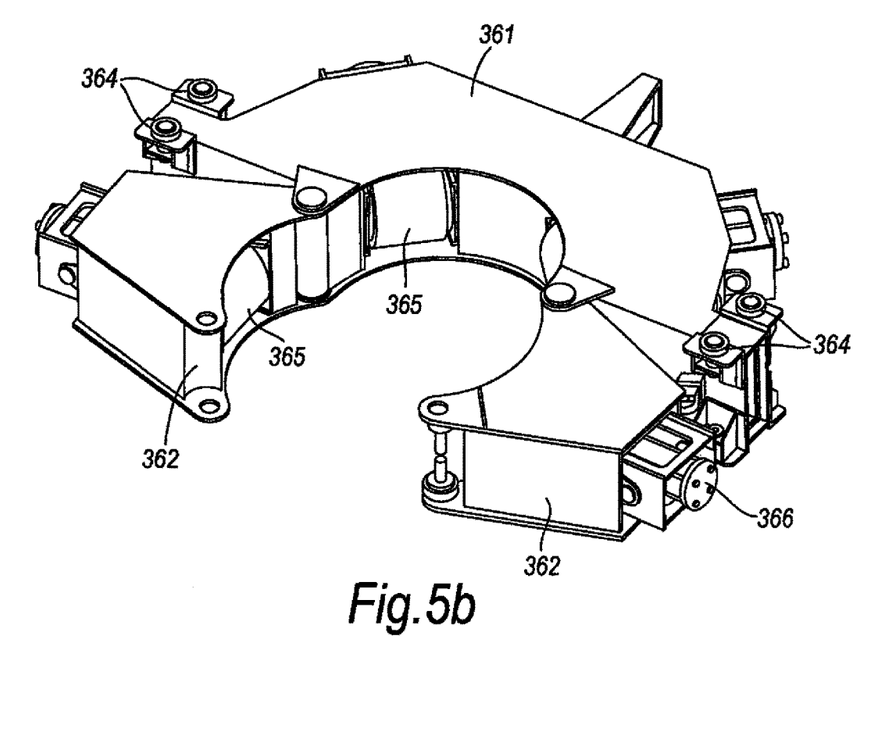
FIG. 5b shows a perspective view of part of the tower clamp mechanism.

A line-up clamp mechanism 352 is provided above the tower arm 371 and is described in more detail in relation to FIGS. 5a and 5b.

The welding station 500 is provided with a roof 502 with a turntable 503 on the roof 502. The turntable 503 is provided with a central pipe opening (not shown). Hence, the turntable allows a weld joint to be provided all the way round the circumference of the pipe strings.

This station welds the pipestring above it (for example P2) to the pipestring below it (for example, P1) which, by then, may be regarded as the upper end of the pipeline P. The welding station 500 also carries out non-destructive test (NDT) to check the pipestrings.

A line-up clamp mechanism 353 is provided on the roof 502 of the welding station 500. This line-up clamp mechanism 353 is identical to the line-up clamp mechanism 352 higher up the tower 300.

The welding station 500 is provided with a safety balcony 550 extending out from the welding station to under the string axis 408. The safety balcony 550 prevents the pipestring (P2) from falling down, while being transferred from the string axis 408 to the pipe-laying axis 303.

Underneath the floor 501 of the welding station 500 is another clamp 372. This clamp 372 acts to keep the pipeline P, including the previously welded pipestring P1, in the lower section 310 of the tower in position.

A similar clamp 373 is also provided in the lower section 310 of the tower. This clamp 373 is located towards the top of the lower part 312 of the lower section 310 of the tower. This clamp is mounted on a tiltable base so that it can be tilted into and out of the pipe-laying axis 303. As the clamp 373 can be moved out of the pipe-laying axis 303, this allows for the travelling clamp assembly 340 to travel up and down on the pipe-laying axis 303 and pass this clamp 373.

FIG. 2a also shows a pivoted hydraulic ram 316 that is used to collapse the tower 300 into transit and bridge-passage configurations.

Figure 2C:
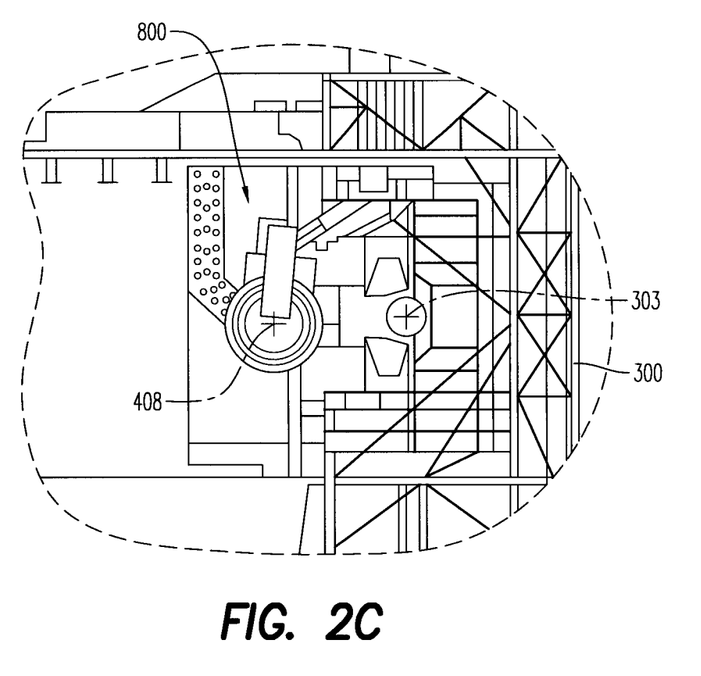
FIG. 2c shows a top view of part of the tower, also in an initial state.

FIG. 2c shows a plan view of the tower clamp assembly 800 holding a pipestring on the string axis 408. The figure also shows the position of the pipe-laying axis 303 of the tower 300.

Figure 3:
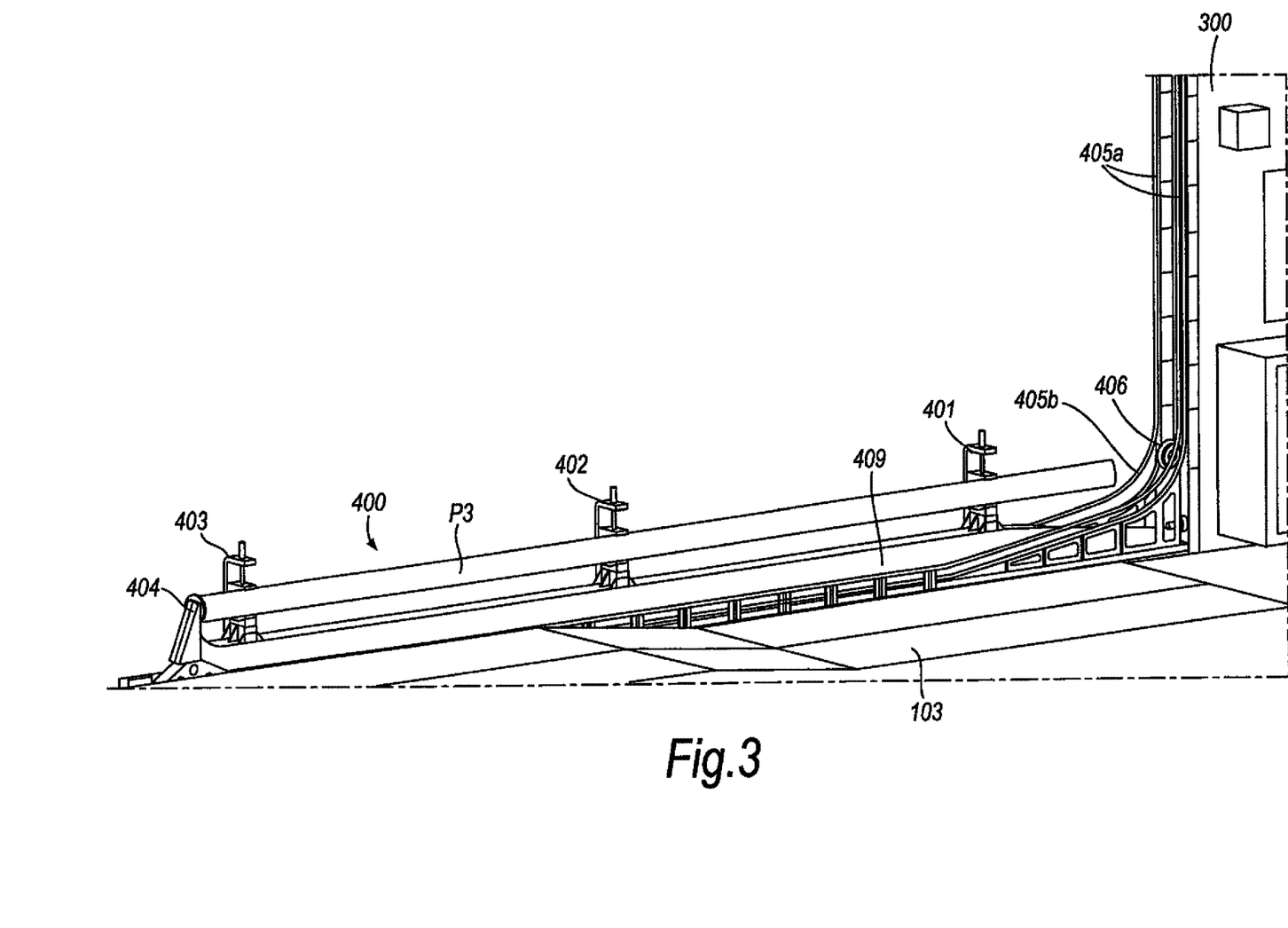
FIG. 3 shows a perspective view of the string elevator, on the deck of the vessel of FIG. 1.

FIG. 3 shows the string elevator 400 at the base of the tower 300. The string elevator comprises a main beam structure 409 with three clamps 401, 402, 403 distributed along the length of the beam 409. These clamps 401, 402, 403 hold a pipestring P3 on the string elevator. These clamps are fail-safe and are designed to remain closed in the absence of hydraulic power, for example. They are also designed not to open until a pipestring P3 is being gripped by the tower clamp assembly 800 and tower arm 371, as will be described later. These clamps are designed to take an axial load of 10% the weight of the heaviest pipestring to be used.

The string elevator is also provided with a shoe 404 at a second end furthest away from the tower 300. The shoe 404 provides permanent support for the pipestring P3 while on the string elevator 400 and is designed to take the weight of the heaviest pipestring to be used. The main beam structure 409 is mounted at its first end on a locomotion trolley 406. This locomotion trolley runs up and down the tower 300 on rails 405a. There are also further rails 405b that extend away from the base of the tower along the deck 103 of the vessel and provide a guide for a roller provided on the second end of the string elevator 400. Importantly, the rails 405b are curved at the region at the base of the tower 300 so as to provide support for the second end of the string elevator 400 in this region and prevent it getting wedged in the corner at the base of the tower.

FIGS. 4a, 4b, 4c and 4d show detailed views of the tower clamp assembly 800 at the top of the tower 300. The tower clamp assembly comprises a trolley 801 with rollers 804 on each of its four corners. The rollers 804 are engaged in two vertical parallel rails 802, to allow the trolley 801 to run up and down the rails 802 by +/−1800 mm. A hydraulic cylinder 803 is connected to the top of the trolley 801 to control movement of the trolley 801 on the rails 802. The hydraulic cylinder 803 also acts as a weight compensation system to accurately control the approach of the pipestring P2 to the pipeline P to which it is to be joined in the welding station 500.

Figure 4A:
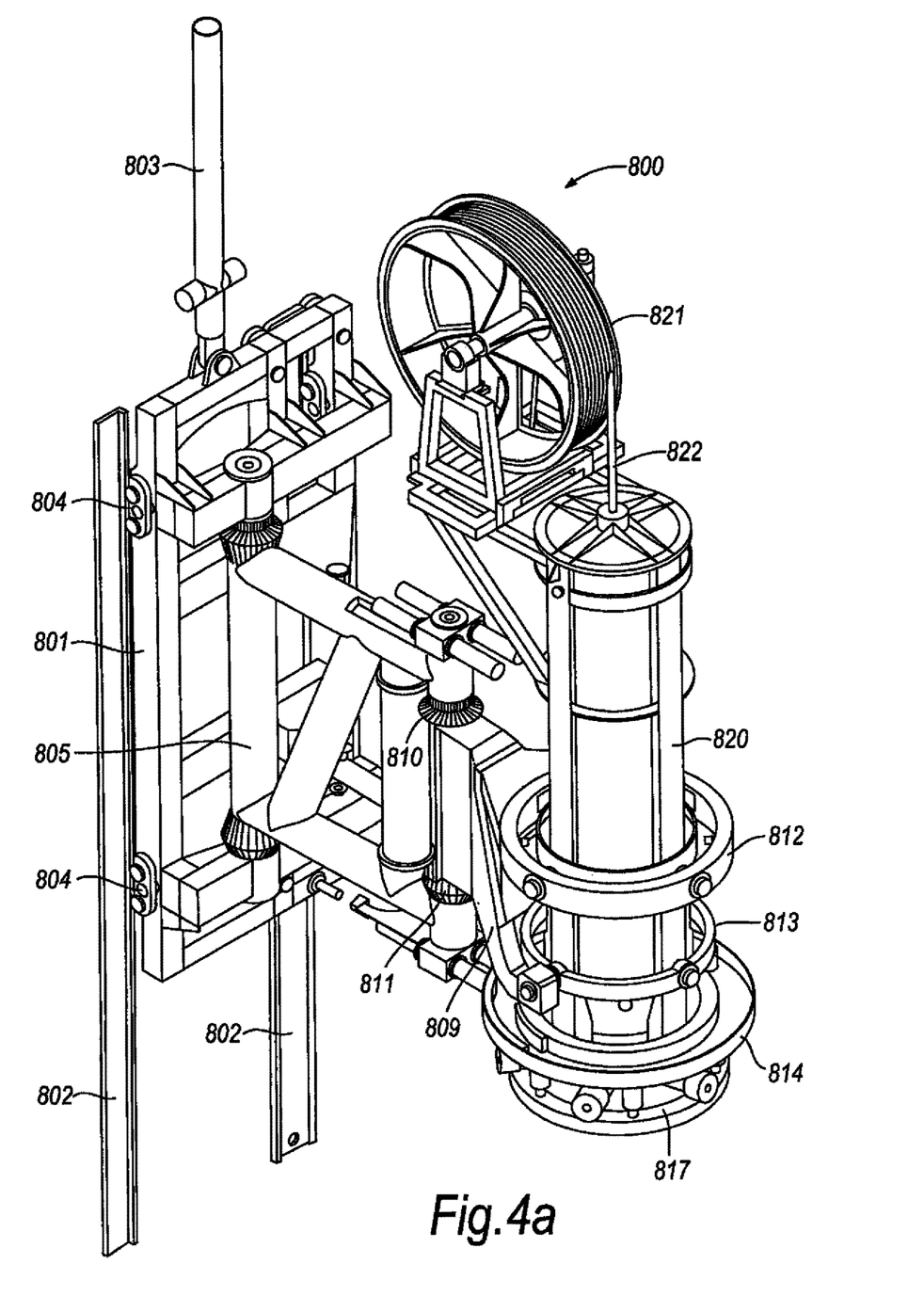
FIG. 4a shows a perspective view of a tower clamp assembly.
Figure 4B:
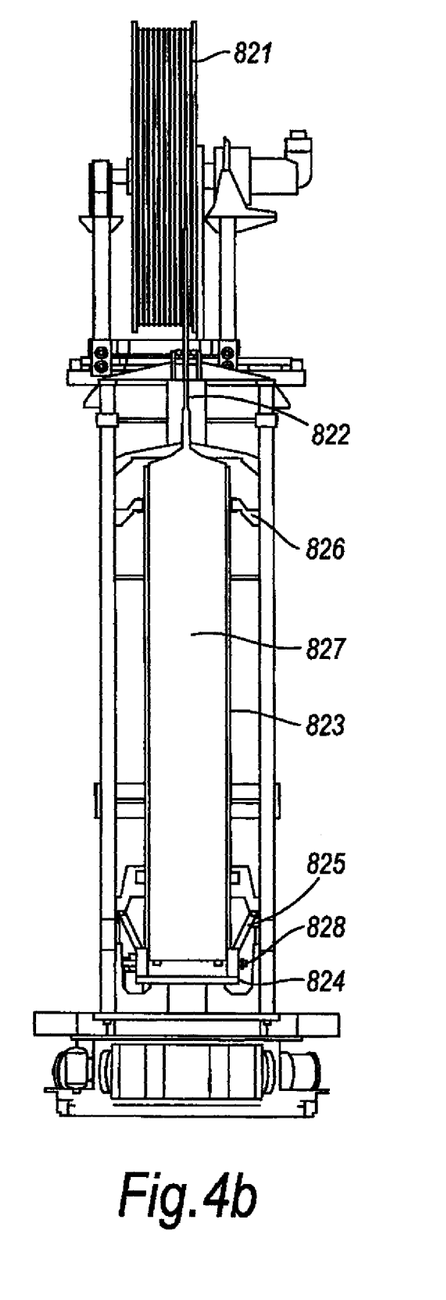
FIG. 4b shows a front view of the tower clamp assembly.
Figure 4C:
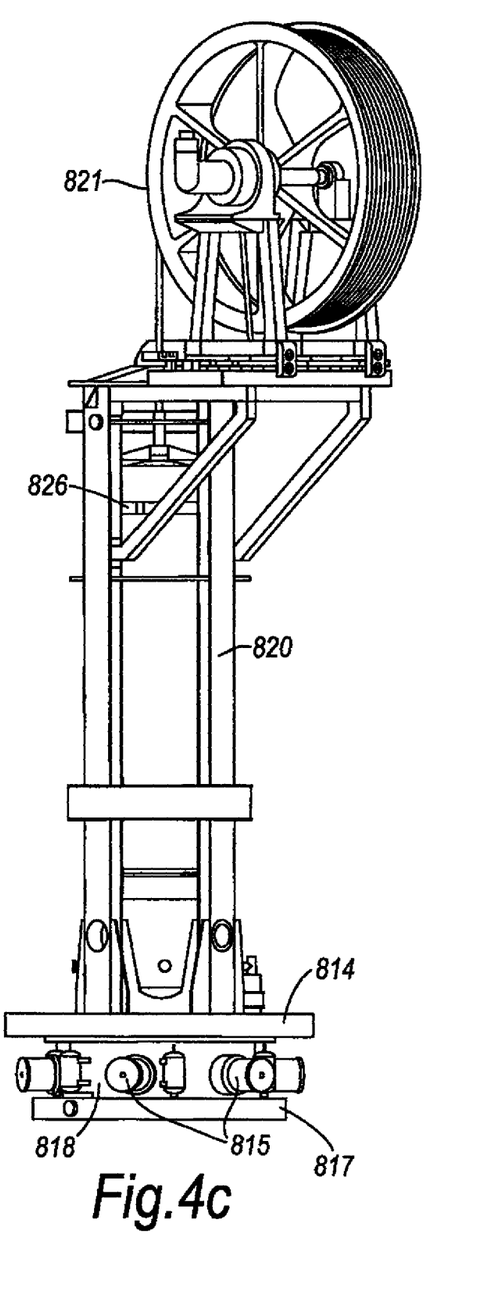
FIG. 4c shows a side view of the tower clamp assembly.

A framework (first arm) 805 is mounted on the trolley 801 so that it can pivot about a vertical axis. The framework (first arm) 805 therefore acts as a first arm extending outwards horizontally from the trolley 801. The framework (first arm) 805 can be rotated with respect to the trolley 801 by two hydraulic cylinders (not shown). The framework (first arm) 805 comprises a vertical end rod at a distal end, with a secondary arm 809 mounted on it. The secondary arm 809 comprises a sleeve portion which fits over the end rod to allow the secondary arm 809 to pivot about the vertical end rod. The secondary arm can be rotated with respect to the first arm framework (first arm) 805 by two rotary actuators 810, 811 mounted on the end rod at either end of the sleeve.

The pivotally mounted framework (first arm) 805 and secondary arm 809 allow the distal end of the secondary arm 809 to be pivoted from the string axis 408 to the pipe-laying axis 303. This means that a pipestring P2 held by the tower clamp assembly 800 (as will be described later) can be transferred to the pipe-laying axis 303 from the string axis 408. It also allows the pipestring P2 to be lined up on the pipe-laying axis 303 with the pipeline P, to which it is to be joined, beneath it.

On the distal end of the secondary arm 809, is a mounting ring 813 with a vertically extending Internal Line-Up Clamp (ILUC) garage frame 820 within the mounting ring 813. The mounting ring 813 is pivotally mounted on the secondary arm 809 for pivotal movement about a first horizontal axis and the garage frame 820 is pivotally mounted on the mounting ring 813 for pivotal movement about a second horizontal axis perpendicular to the first horizontal axis. These two pivotal mountings thus define a Cardan joint allowing the garage frame 820 to pivot about a vertical axis in any direction. Pivoting is restricted to about three degrees by a restraining ring 812 fixed to the secondary arm 809. Furthermore retractable restraints are provided inside the ring 812, which when not retracted, prevent any pivoting of the garage frame 820. The garage frame 820 takes the form of an elongate cage. Within the cage is an ILUC guide 823 (FIG. 4b) in the form of an elongate tube extending along the longitudinal axis of the cage. The guide 823 has a diameter to correspond to an ILUC 827 contained in the guide 823. The guide 823 is attached to the inside of the cage by a gimbal joint 826. This gimbal joint 826 allows guide 823 to pivot slightly within the cage. At the bottom end of the guide 823 is a bevel protector 824. This bevel protector 824 is installed around the top of the pipestring P2 by 4 hydraulic cylinders 825.

In addition, also at the bottom of the guide 823 are four radial safety pins 828 that can be moved in and out to prevent an ILUC 827 from falling through the guide 823. As an additional/alternative safety mechanism, safety pins may be installed at a top end of the ILUC 827 to latch the ILUC on the top of the guide 823.

Figure 4D:
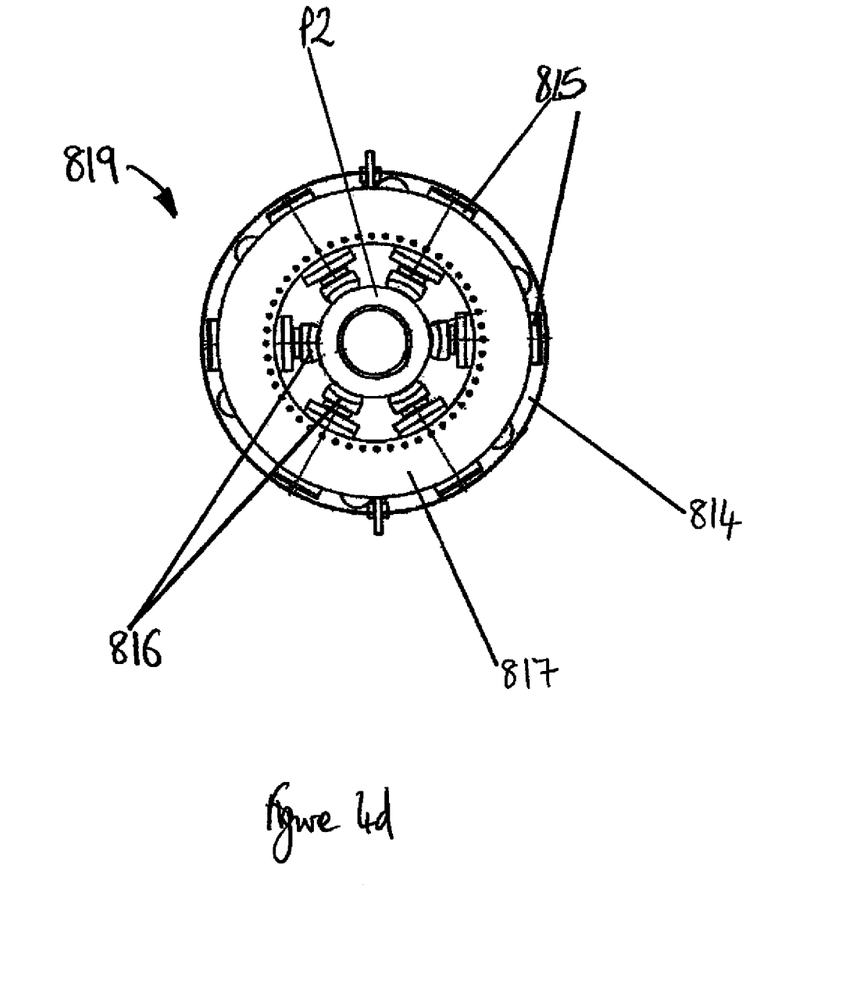
FIG. 4d shows a bottom view of the friction clamp on the tower clamp assembly.

Below, the mounting ring 813 is a further ring 814 for mounting a rotatable friction clamp 819 at the lower end of the garage frame 820. A still further ring 817 is provided beneath the ring 814 and a rotatable sleeve 818 is provided in between the rings 814 and 817. The sleeve 818 can rotate about the longitudinal axis of the garage frame 820. Distributed around the circumference of the sleeve 818 are 6 radial cylinders 815 which can be moved radially in and out with respect to the longitudinal axis. At the inner end of each cylinder 815 is a friction pad 816. The radial cylinders 815 can move in and out to allow these friction pads 816 to grip a pipestring P2 and support its weight. As the friction pads 816 can be moved in and out a variety of pipestring diameters (from 8 inches to 36 inches diameter) can be accommodated. As can be seen in FIG. 4d, the friction pads 816 are shaped to correspond to the rounded shape of the outer circumference of the pipestring P2. The sleeve 818 can be rotated +/−190 degrees about the longitudinal axis to allow the pipestring P2 to be rotated to any orientation about that axis. This allows the gap between bevels and the out-of roundness between the pipestring P2 and the pipeline P to which it will be joined, to be balanced out.

The ILUC 827 is connected at its top end to a cable 822 which is wound around an ILUC winch wheel 821. This winch wheel is mounted at the top of the ILUC garage frame 820. The winch wheel 821 can be rotated to deploy and retract the cable 822, which causes the ILUC to be lowered and raised through the guide 823. By fully deploying the cable 822, the ILUC 827 can be lowered down through a pipestring P2 held by the friction clamp 819 and down to the level of the floor 501 of the welding station 500.

The friction clamp 819 and the ILUC garage frame 820, are rotatable relative to one another about the axis of the garage frame but not otherwise adjustable, so that, when the clamp 819 is clamped to the top of the pipestring P2, the ILUC garage frame is automatically aligned with the pipestring P2. Furthermore that alignment is maintained when the garage frame and friction clamp are allowed to pivot about a vertical axis during alignment of a pipestring.

The tower clamp assembly 800 also comprises a preheating system (not shown) for induction heating the pipestring P2.

The clamps 401, 402, 403 on the string elevator 400 and the friction clamp 819 on the tower clamp assembly 800 are designed so that they cannot be open at the same time. This prevents a pipestring P2 from being dropped. This is achieved by having a mechanical sensor roller (or rollers) on the tower clamp assembly 800 that detect when the pipestring P2 is clamped in the friction clamp 819. When a pipestring P2 is held in the friction clamp 819, the mechanical sensor roller abuts a wheel and operates a valve (or valves). This allows hydraulic fluid to flow in various flow paths and allow the string elevator clamps 401, 402, 403 to open. Importantly, in the absence of any hydraulic flow (i.e. in a natural state), the clamps 401, 402, 403 remain closed.

FIGS. 5a and 5b show a line-up clamp mechanism 352 (the line-up clamp mechanism 353 being of the same design). The line-up clamp mechanism 352 comprises a truss frame 360 upon which the clamp itself is mounted. The clamp itself comprises a main body 361 located in the truss structure 360 and two clamp fingers 362 protruding out from the main body 361 outside the truss structure 360.

The outside edge of the main body 361 has an approximately semi-circular notch to accommodate one half of a pipestring. The two clamp fingers 362 are pivotally mounted on the main body 361 so as to be able to rotate inwards towards each other. Hydraulic cylinders 366 are provided to actuate the clamp finger 362. Each finger 362 has a curved inward edge so as to form a circular hole with the main body 361 when in a closed position. A pipestring can be held in this circular hole. The main body 361 also comprises two rollers and each finger comprises one roller each at the curved edges. These four rollers 365 allow a pipestring to be held by the clamp in a certain horizontal position whilst still allowing the pipestring to be moved vertically up and down through the clamp.

Rollers 363 are mounted on the truss frame 360 to allow the truss frame 360 to move forwards and backwards in relation to the tower 300. The main body 361 of the clamp is also provided with rollers 364 to allow the clamp to be moved sideways in relation to the truss frame 360.

Laying of a pipeline using the tower 300 will now be described with particular reference to the operation of the tower clamp assembly 800, including the ILUC arrangement. Details of the general operation away from the tower clamp assembly and the ILUC arrangement are generally not of relevance to the present invention and are not described fully here. A more detailed description of them can be found in UK patent application entitled "Pipe-laying Vessel and Method of Laying a Pipeline" with agent's reference "P015336 GB", having the same filing date as the present application. As already indicated, the contents of that application are fully incorporated herein by reference.

FIG. 2a, which has already been described, shows the tower 300 and associated equipment in a first state. Here, pipestring P1 is on the lower section 310 of the tower and is welded to pipestring PS and the deployed pipeline P. Pipestring P2 is located on the upper section 311 of the tower. It is being held by the friction clamp 819 of the tower clamp assembly 800 and tower arm 371. The ILUC 827 is partly deployed and is positioned mid-way down the length of the pipestring P2. As will be appreciated, because the friction clamp assembly and the ILUC arrangement are one unit, the insertion of the ILUC into the pipestring P2 requires no lining up of those parts relative to one another. Pipestring P2 is not held directly above pipestring P1 on the pipe-laying axis 303. Instead, it is held in a stand-by position in between the string axis 408 and the pipe-laying axis 303. Pipestring P3 is clamped to string elevator 400 on the deck 103 of the vessel.

In the state shown in FIG. 2a, the friction clamp 343 holds the top of the pipestring PS. The hang off clamp 330 is open. The travelling clamp assembly 340 has just deployed pipeline after moving from the top of its travel path to the bottom of its travel path, as shown in FIG. 2a. The line-up clamp mechanisms 352 and 353 are open and the friction clamp 819 is closed and holding the weight of the pipestring P2, while the tower arm 371 retains a lower part of the pipestring P2 in position.

The hang off clamp 330 is then closed around pipestring PS to take the weight of the deployed pipeline P below it. Once the hang off clamp is taking this weight, the friction clamp 343 is released from PS. The framework (first arm) 805 and secondary 809 arms of the tower clamp assembly 800 (and the corresponding tower arm 371) are rotated to bring pipestring P2 onto the pipe-laying axis 303.

The ILUC 827 is lowered further down pipestring P2 to the join of pipestrings P2 and P1. Line-up clamp mechanisms 352, 353 and tower roller 370 are closed around pipestring P2. The tower arm 371 is then released from pipestring P2 and rotated back to the stand-by position.

Line-up is performed using line-up clamp mechanisms 352, 353. Friction clamp 819 and tower roller 370 follow the movement of the pipestring P2 and are "slave" line-up devices. If necessary, friction clamp 819 is rotated to match the off-roundness of the upper end of pipestring P1 with the lower end of pipestring P2. This line-up operation is performed by welding station 500 operators using a hand-held portable console.

Welding of pipestrings P1 and P2 is then performed in the welding station 500, with the ILUC 827 in position inside the pipeline at the junction of the pipestrings P1 and P2. Also the pipestring P1 may be coated or otherwise treated in the coating station 600.

Once welding of pipestrings PI and P2 is complete, the ILUC is raised up through pipestring P2 to the garage frame 820. The tower roller 370 is energised so that the pipestring P2 can be held in position. The friction clamp 819 is then released and the framework (first arm) 805 and secondary 809 arms of the tower clamp assembly 800 are rotated so that the friction clamp 819 is rotated to the stand-by position. The clamp 373 is folded into its stand-by position and the travelling clamp assembly 340 is raised past the clamp 373 towards the top of its travel path.

Friction clamp 819 and tower arm 371 are then moved from the stand-by position and closed around the next pipestring P3 which has by then been raised on the string elevator 400 and the string elevator clamps 401, 402, 403 are released. The framework (first arm) 805 and secondary 809 arms of the tower clamp assembly 800 (and the tower arm 371) are then rotated to bring pipestring P3 into the stand-by position above the safety balcony 550. The ILUC 827 is lowered through pipestring P3 to about mid-way along its length. When the travelling clamp assembly 340 has reached the top of its travel path just below the welding station 500, it is clamped around the top region of the pipestring PI. The travelling clamp assembly 340 then takes the weight of the deployed pipeline P and pipestrings PS and PI. The hang-off clamp is then released and the travelling clamp assembly 340 is lowered to deploy pipeline. It is lowered to the bottom of its travel path (as in FIG. 2a). This pulls pipestring PI into the position occupied by pipestring PS in FIG. 2a. It also pulls down pipestring P2 to the position occupied by pipestring PI in FIG. 2a. The line up clamp mechanisms 352 and 353 are released and other parts are also then returned to the first state of FIG. 2a again, ready to deploy another pipestring of pipeline.

It can be seen that in this embodiment of the invention, the top section of the tower 311 is used for receiving the pipestring P3 from the string elevator 400 and for line-up of the pipe-string on the pipe-laying path 303. The bottom section of the tower 310 is used for welding the pipestrings P3, P2, P1 and the pipeline P together and lowering the joined pipeline P from the top of the bottom section 310 using the travelling clamp assembly 340.

Whilst the present invention has been described and illustrated with reference to a particular embodiment, it will be appreciated by those of ordinary skill in the art that the invention lends itself to many different variations not specifically illustrated herein.

For example, the embodiment described above is designed for use in laying pipestring formed from 3 joints (3J). In other words, each pipestring is made up of 3 lengths of pipe, welded or pre-fabricated together in some way. This pre-fabrication usually takes place on the vessel. A typical 3J pipestring will be approximately 37.5 m long. However, other embodiments may be designed for laying 1J, 2J, 4J, or more. As will be understood, a 1J pipestring consists of a single length of pipe.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pipe-laying vessel including a pipe-laying tower extending upwardly from the vessel, the vessel comprising:
   a welding station for joining a new pipestring to an end of the pipeline held by the tower,
   a clamp assembly on the tower for engaging the new pipestring with a lower end adjacent to the end of the pipeline held by the tower and with the new pipestring extending upwardly from its lower end alongside the tower,
   wherein the clamp assembly comprises a pipestring clamp configured to serve both the function of a transfer clamp for transferring the new pipestring from a position alongside the tower but displaced from the pipe-laying path to a position approximately aligned with the pipe-laying path, and the function of a line-up clamp for lining up the new pipestring with the end of the pipeline wherein the clamp assembly is mounted for pivotal movement about an axis substantially parallel to the longitudinal axis of the tower, in which the pipestring clamp is arranged to bear at least a major part of the weight of the new pipestring.

2. A pipe-laying vessel according to claim 1, in which the pipestring clamp is a friction clamp.

3. A pipe-laying vessel according to claim 1 further including one or more further line-up clamps for lining up the new pipestring with the end of the pipeline.

4. A pipe-laying vessel including a pipe-laying tower extending upwardly from the vessel, the vessel comprising:
   a welding station for joining a new pipestring to an end of the pipeline held by the tower,
   a clamp assembly on the tower for engaging the new pipestring with a lower end adjacent to the end of the pipeline held by the tower and with the new pipestring extending upwardly from its lower end alongside the tower,
   wherein the clamp assembly comprises a pipestring clamp configured to serve both the function of a transfer clamp for transferring the new pipestring from a position alongside the tower but displaced from a pipe-laying path to a position approximately aligned with the pipe-laying path, and the function of a line-up clamp for lining up the new pipestring with the end of the pipeline wherein the orientation of the pipestring clamp is adjustable through pivoting movement of the pipestring clamp about two mutually perpendicular axes that are themselves perpendicular to the longitudinal axis of the tower.

5. A pipe-laying vessel according to claim 4, in which the pipestring clamp is a friction clamp.

6. A pipe-laying vessel according to claim 4, in which the pipestring clamp is arranged to bear at least the major part of the weight of the new pipestring.

7. A pipe-laying vessel according to claim 4 further including one or more further line-up clamps for lining up the new pipestring with the end of the pipeline.

8. A pipe-laying vessel according to claim 4, in which the clamp assembly is mounted for translational movement in a direction substantially parallel to the longitudinal axis of the tower.

9. A pipe-laying vessel according to claim 4, in which the pipestring clamp is also able to rotate the new pipestring about its longitudinal axis.

10. A pipe-laying vessel according to claim 4, in which the clamp assembly further includes an internal line-up clamp arrangement.

11. A pipe-laying vessel including a pipe-laying tower extending upwardly from the vessel, the vessel comprising:
    a welding station for joining a new pipestring to an end of the pipeline held by the tower,
    a clamp assembly on the tower for engaging the new pipestring with a lower end adjacent to the end of the pipeline held by the tower and with the new pipestring extending upwardly from its lower end alongside the tower,
    wherein the clamp assembly comprises a pipestring clamp configured to serve both the function of a transfer clamp for transferring the new pipestring from a position alongside the tower but displaced from the pipe-laying path to a position approximately aligned with the pipe-laying path, and the function of a line-up clamp for lining up the new pipestring with the end of the pipeline wherein the clamp assembly is mounted for pivotal movement about an axis substantially parallel to the longitudinal axis of the tower, in which the pipestring clamp is also able to rotate the new pipestring about its longitudinal axis.

12. A pipe-laying vessel according to claim 11, in which the pipestring clamp is a friction clamp.

13. A pipe-laying vessel according to claim 11 further including one or more further line-up clamps for lining up the new pipestring with the end of the pipeline.

14. A pipe-laying vessel including a pipe-laying tower extending upwardly from the vessel, the vessel comprising:
    a welding station for joining a new pipestring to an end of the pipeline held by the tower,
    a clamp assembly on the tower for engaging the new pipestring with a lower end adjacent to the end of the pipeline held by the tower and with the new pipestring extending upwardly from its lower end alongside the tower,
    wherein the clamp assembly comprises a pipestring clamp configured to serve both the function of a transfer clamp for transferring the new pipestring from a position alongside the tower but displaced from the pipe-laying path to a position approximately aligned with the pipe-laying path, and the function of a line-up clamp for lining up the new pipestring with the end of the pipeline wherein the clamp assembly is mounted for pivotal movement about an axis substantially parallel to the longitudinal axis of the tower, in which the clamp assembly further includes an internal line-up clamp arrangement.

15. A pipe-laying vessel according to claim 14, in which the internal line-up clamp arrangement includes an internal line-up clamp garage and an internal line-up clamp.

16. A pipe-laying vessel according to claim 15, in which the internal line-up clamp arrangement further includes an internal line-up clamp winch for raising and lowering the internal line-up clamp within the new pipestring.

17. A pipe-laying vessel according to claim 14, in which the internal line-up clamp arrangement and the pipestring clamp are adjustably mounted for adjustment as a unit of their orientation relative to the tower.

18. A pipe-laying vessel according to claim 14, wherein the internal line-up clamp arrangement and the pipestring clamp are adjustably mounted for adjustment, as a unit, of their orientation relative to the tower, and the internal line-up clamp arrangement and the pipestring clamp are fixed in relation to each other.

19. A pipe-laying vessel according to claim 14, in which the pipestring clamp is a friction clamp.

20. A pipe-laying vessel according to claim 14 further including one or more further line-up clamps for lining up the new pipestring with the end of the pipeline.

21. A method of joining a new pipestring to a pipeline on the pipe-laying vessel
according to claim 1, the method comprising:
transferring the new pipestring from a position alongside the tower but displaced from the pipe-laying path to a position approximately aligned with the pipe-laying path; using the pipestring clamp serving as a transfer clamp,
lining up the new pipestring with the end of the pipeline held by the tower, using the pipestring clamp serving as a line-up clamp;
engaging the new pipestring with the lower end adjacent to the end of the pipeline held by the tower and with the new pipestring extending upwardly from its lower end alongside the tower, using the clamp assembly on the tower; and
joining the new pipestring to the end of the pipeline held by the tower at the welding station.

22. A method of joining a new pipestring to a pipeline on the pipe-laying vessel
according to claim 4, the method comprising:
transferring the new pipestring from a position alongside the tower but displaced from a pipe-laying path to a position approximately aligned with the pipe-laying path, using the pipestring clamp serving as a transfer clamp;
lining up the new pipestring with the end of the pipeline held by the tower, using the pipestring clamp serving as a line-up clamp;
engaging the new pipestring with the lower end adjacent to the end of the pipeline held by the tower and with the new pipestring extending upwardly from its lower end alongside the tower, using the clamp assembly on the tower; and
joining the new pipestring to the end of the pipeline held by the tower at the welding station.

23. A method of joining a new pipestring to a pipeline on the pipe-laying vessel
according to claim 1, the method comprising:
transferring the new pipestring from a position alongside the tower but displaced from the pipe-laying path to a position approximately aligned with the pipe-laying path, using the pipestring clamp serving as a transfer clamp;
lining up the new pipestring with the end of the pipeline held by the tower, using the pipestring clamp serving as a line-up clamp;
engaging the new pipestring with the lower end adjacent to the end of the pipeline held by the tower and with the new pipestring extending upwardly from its lower end alongside the tower, using the clamp assembly on the tower; and
joining the new pipestring to the end of the pipeline held by the tower at the welding station.

24. A method of joining a new pipestring to a pipeline on the pipe-laying vessel
according to claim 14, the method comprising:
transferring the new pipestring from a position alongside the tower but displaced from the pipe-laying path to a position approximately aligned with the pipe-laying path, using the pipestring clamp serving as a transfer clamp;
lining up the new pipestring with the end of the pipeline held by the tower, using the pipestring clamp serving as a line-up clamp;
engaging the new pipestring with the lower end adjacent to the end of the pipeline held by the tower and with the new pipestring extending upwardly from its lower end alongside the tower, using the clamp assembly on the tower; and
joining the new pipestring to the end of the pipeline held by the tower at the welding station.

* * * * *